UNITED STATES PATENT OFFICE.

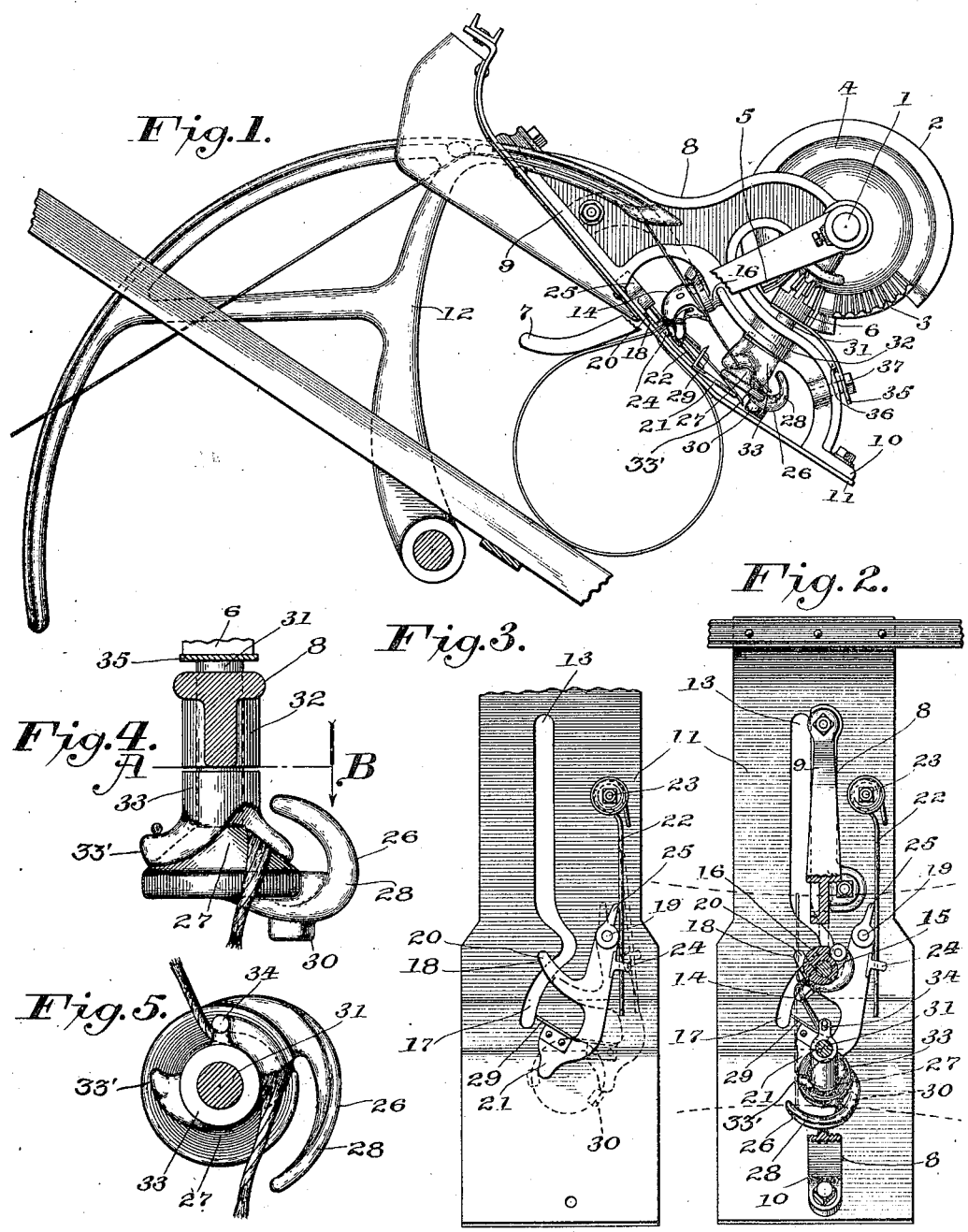

GUSTAV W. WITTE, OF CHICAGO, ILLINOIS, ASSIGNOR TO INTERNATIONAL HARVESTER COMPANY OF NEW JERSEY, A CORPORATION OF NEW JERSEY.

CORD-KNOTTER FOR GRAIN-BINDERS.

1,155,860.  Specification of Letters Patent.  Patented Oct. 5, 1915.

Application filed November 14, 1912. Serial No. 731,277.

*To all whom it may concern:*

Be it known that I, GUSTAV W. WITTE, a citizen of the United States, residing at Chicago, in the county of Cook and State of Illinois, have invented certain new and useful Improvements in Cord-Knotters for Grain-Binders, of which the following is a specification.

My invention relates to cord knotters for grain binders, and in particular to improved means for operating the cord gate, means for severing the cord, and to improvements in the cord holding device; its object being to make a cord knotter mechanism more efficient in operation and simple in construction.

In order that my invention may be clearly and fully disclosed, I have illustrated in the accompanying drawings one embodiment which the same may assume in practice, using this embodiment merely as an illustration of the invention itself which may be embodied in various forms.

In these drawings:—Figure 1 is a side elevation of a knotter mechanism having my invention forming a part thereof; Fig. 2 is a top plan view of the breastplate with the knotter frame, knotter head and cord holder shown in section and designed to illustrate the manner of mounting the cord gate; Fig. 3 is a partial top plan view of the breastplate and illustrating the operation of the cord gate; Fig. 4 is a rear elevation of the cord holder; and Fig. 5 is a cross section of Fig. 4 along line A—B.

The mechanism illustrated includes a knotter driving shaft 1, having a cam wheel 2 secured thereto, the cam being provided with the usual toothed portion 3, a delay surface 4 that operatively engages with the knotter actuating pinion 5 and cord holder actuating pinion 6.

7 represents a bundle discharging arm secured to the cam wheel.

8 represents the knotter frame having a bearing at the upper end thereof in which the shaft 1 is journaled, and front and rear base members 9 and 10, respectively, whereby the frame is secured to the breastplate 11.

12 represents the needle, and the breastplate is provided with a longitudinally arranged slot 13 adapted to receive the needle during a part of the operative movement thereof.

14 represents a common form of knotter hook having its shank portion 15 journaled in a bearing 16 formed in frame 8 and arranged in substantially a radial line relative to the axis of shaft 1, the pinion 5 being secured to the upper end of the shank portion 15.

The knotter hook in its initial position trends rearward, and 17 represents a continuation of the slot 13, curving inward toward the axis of the knotter hook and then rearward and outward beyond the path of movement of the knotter hook and adapted to guide the cord during the operation of the knot tying mechanism.

18 represents a cord retaining arm pivotally connected with the breastplate by means of a pivot pin 19, the arm being provided with a gate portion 20 adapted to be projected across the slot 17 in a manner to prevent the cord from passing therethrough, and a rearwardly extending cam portion 21 that coacts with the cord holding mechanism in a manner to control the movement of the arm in a direction to release the cord, a plate spring 22 having one end secured to the breastplate by means of a bolt 23 and its opposite end received by a saddle member 24 carried by the cord retaining arm in a manner to move the arm in an opposite direction, the arm being provided with a tail member 25 that contacts with spring 22 in a manner to limit a movement of the arm in a direction to pass the gate portion 20 across the slot 17 in the breastplate.

The cord holder includes a rotatable member 26 having a conical upper surface 27, a cord engaging arm 28 integral with said member and arranged approximately concentric with the axis thereof and adapted to present the cord in proper position to be engaged by the cord holding member. A cord severing knife 29 is secured to the rearwardly extending portion 21 of the cord retaining arm 18. A downwardly projecting stem or lug 30 is eccentrically arranged relative to the axis of the rotatable member 26 and carried thereby. As shown, this lug 30 is adapted to contact with the rearwardly extending portion 21 of the arm 18 in a manner to swing said arm about the axis thereof in a direction to remove the cord gate 20 from the slot 17 and to sever the cord between the cord holder and the knotter hook. A shank 31 is journaled in a bearing 32, said bearing forming a part of the knotter frame 8 and arranged substantially radial relative to the axis of the knotter driving shaft 1, the cord holder actuating pinion 6 being secured to the upper end of said shank.

33 represents a non-rotatable member of the cord holding mechanism that is loosely mounted upon the shank 31 between the bearing therefor in the frame and the rotatable member. This member has its lower end cup-shaped in a manner to coact with the conical surface of the rotatable member in gripping the cord between the opposing surfaces of the two members, and is provided with a radially and upwardly extending, eccentrically disposed cord retaining teat 33', between which and the body of the member 33, the cord is positioned when the needle moves to knotting position in such a manner that it will not slip downward to interfere with the knotting operation. As shown, an upwardly projecting stem 34 is also arranged eccentric to the axis of the shank, and received by an opening in the knotter frame 8 for the purpose of securing the member against rotation. The shank 31 is movable longitudinally in the bearing 32, and 35 represents a plate spring that engages with a fulcrum 36 upon the knotter frame, one end of the spring being provided with an opening that receives the shank 31 below the pinion 6, and the opposite end of the spring is provided with an opening adapted to receive a pressure regulating screw 37 that is screwed into the knotter frame, the spring being operative to cause a variable pressure of the rotatable member of the cord holding mechanism against the non-rotatable member thereof.

In operation of the mechanism the gate 20 is normally projected across the cord slot 17 by the action of the spring 22, the cord passes from the eye of the needle across the cord gate and knotter hook to the cord holding mechanism and is held thereby, and when the needle is advanced the cord encircles the bundle and the second strand is received by the cord holder, the two strands being held by the cord gate 20 and the slot 17 in proper position for engagement by the knotter hook that during the rotative movement thereof forms the knot in the well known way, the rotatable member of the cord holding mechanism being revolved in a manner to grip the needle strand and swing the cord retaining arm beyond the path of the cord and cause the knife carried thereby to sever the same when the knot is completed.

While I have herein specifically described one form which my invention may assume, it is, of course, to be understood that the form chosen for purposes of illustration may be modified without departing from the spirit of my invention, and that I include within the scope of this application all such modifications.

What I claim as my invention, and desire to secure by Letters Patent, is:

1. In a knotter mechanism, a cord gate member having a laterally extending cord gate projecting therefrom at a point intermediate its ends and having a knife carried at one end thereof.

2. In a knotter mechanism, a cord gate member having a laterally extending cord gate disposed in the same plane therewith and intermediate its ends, and a knife carried at one end of said gate member.

3. In a knotter mechanism, a cord gate member having a cord gate extending laterally therefrom at a point between its ends and a knife disposed substantially at right angles to said gate member.

4. In a knotter mechanism, a cord gate member having a laterally extending cord gate between its ends, and a knife disposed substantially at right angles to said gate member and having an upper cutting edge.

5. In a knotter mechanism, a cord gate member having a laterally extending cord gate intermediate its ends, a knife carried at one end of said gate member and a cam surface carried on said member adjacent said knife.

6. In a knotter mechanism, a slotted breast plate, a cord gate pivotally mounted thereon and movable across the slot in said breast plate, and a knife carried on said cord gate.

7. In a knotter mechanism, a slotted breast plate, and a member pivoted thereon and movable with respect to the slot therein having a knife at one end thereof and a cord gate intermediate said knife and said pivot.

8. In a knotter mechanism, a breast plate, a member pivoted thereon, a knife carried by said member and a rotatable cord holder engageable with said member and actuating the same automatically at a predetermined time in the knotting operation.

9. In a knotter mechanism, a slotted breast plate, a movable cord holder, and a combined cord gate and knife member operatively connected to said cord holder and movable thereby with respect to the slot in said breast plate.

10. In a knotter mechanism, a breast plate, a movable cord holder, a knife pivoted to said breast plate having a cam-shaped end engaging said holder, and resilient means normally holding said knife in the path of said holder.

11. In a knotter mechanism, a slotted breast plate, a rotatable cord holding member, a combined cord gate and cutting member pivotally connected to said breast plate, and a cam connection intermediate said cord holder and cord gate adjusting the latter relatively to the slot in said breast plate upon movement of said cord holder.

12. In a knotter mechanism, a slotted breast plate, a cord gate and cutting member pivoted thereon and disposed in the plane thereof, and resilient means carried on said breast plate and disposed in the plane of said cord gate and cutting member normally maintaining the cord gate of the latter in position across the slot in said breast plate.

13. In a knotter mechanism, a slotted breast plate, a member pivoted thereon and movable with respect to the slot therein having a knife at one end thereof and a cord gate intermediate said knife and said pivot, a movable cord holder, and means carried on said cord holder and engaging said member moving the latter with respect to the slot in said breast plate when said cord holder is actuated.

14. In a knotter mechanism, a slotted breast plate, an arm pivoted thereon having a cord gate movable with respect to the slot in said plate, a spring fixed on said breast plate having one end freely movable through a saddle on said arm, and a stop carried on the opposite side of the arm pivot from said saddle limiting the movement of said arm with respect to said spring.

15. In a knotter mechanism, a slotted breast plate, a combined cord gate and knife member pivotally connected thereto, a rotatable cord holder, a cam connection between said cord holder and said combined cord gate and knife member tending to move the latter in one direction with respect to the slot in said breast plate when said cord holder is actuated, and resilient connections between said breast plate and combined cord gate and knife member normally tending to move the latter in the opposite direction.

16. In a knotter mechanism, a slotted breast plate, a combined cord gate and cutting member pivoted thereon and disposed in the plane thereof, resilient means disposed in the plane of said cord gate and normally maintaining the same in position across the slot in said breast plate, a rotatable cord holder, and operative connections between the same and said combined cord gate and cutting member moving the same relative to the slot in said breast plate and in opposition to said resilient means at predetermined times in the operation of the knotter.

17. In a knotter mechanism, a cord holder comprising a conical rotary portion having an elongated shank, and a sleevelike stationary portion inclosing said shank having a flared lip extending over the conical portion of said rotary element and an upwardly extending cord-retaining member on the upper surface of said lip maintaining the cord between the same and the body of said sleevelike portion.

18. In a knotter mechanism, a cord holder comprising a conical rotary portion having a cord engaging member extending laterally therefrom, and a stationary portion having a flared lip extending over the conical portion of said rotary element and an upwardly extending cord retaining member on the upper surface of said lip maintaining the cord between said member and the body of said stationary portion.

19. A knotter mechanism including, in combination, a rotatable cord holding member, a knotter hook, a breastplate having a cord slot therein, a cord retaining arm pivotally mounted upon said breastplate, a spring operative to project said arm across said slot, a cord severing knife carried by said arm, and a stem arranged upon said rotatable cord holding member, eccentric to the axis thereof and adapted to contact with said cord retaining arm in a manner to move it against the pressure of said spring.

20. A knotter mechanism including, in combination, a rotatable cord holding member, a knotter hook operating mechanism for said elements, a breastplate having a cord slot therein, a cord retaining arm, a cord severing knife carried by said arm, means for projecting said arm across said slot, and means coöperating with said rotatable cord holding member for moving said arm in an opposite direction.

21. A knotter mechanism including, in combination, a rotatable cord holding member, a knotter hook, a breastplate having a cord slot therein, a cord retaining arm having one end thereof pivotally connected with said breastplate and provided with a cam portion at the opposite end thereof, the arm being provided with a cord gate intermediate its ends, a cord severing knife secured to said cam portion, a saddle member carried by said arm at one side of the axis thereof, means for projecting said cord gate across said slot, said means including a plate spring member having one end thereof secured to said breastplate and its opposite end received by said saddle member, a tail member carried by said arm and coöperating with said saddle member in a manner to limit a swinging movement of said arm in one direction, and means carried by said rotatable cord holding member and coöperating with said cam portion for moving said arm in an opposite direction.

GUSTAV W. WITTE.

Witnesses:
J. J. O'Connor.
Chas. Jarmuth.